US007677196B2

(12) United States Patent  
Herre (10) Patent No.: US 7,677,196 B2  
(45) Date of Patent: Mar. 16, 2010

(54) COATING PLANT AND ASSOCIATED METHOD OF COATING AN OBJECT

(75) Inventor: Frank Herre, Obermerriexingen (DE)

(73) Assignee: Durr Systems, Inc., Auburn Hills, MI (US)

( * ) Notice: Subject to any disclaimer, the term of this patent is extended or adjusted under 35 U.S.C. 154(b) by 829 days.

(21) Appl. No.: 11/384,656

(22) Filed: Mar. 20, 2006

(65) Prior Publication Data

US 2006/0207500 A1 Sep. 21, 2006

(30) Foreign Application Priority Data

Mar. 21, 2005 (DE) ........................ 10 2005 013 014

(51) Int. Cl.
*B05B 15/12* (2006.01)
*B05B 3/00* (2006.01)
*B05B 7/06* (2006.01)

(52) U.S. Cl. ........................ 118/326; 118/323; 118/309; 118/DIG. 7; 901/43; 454/50

(58) Field of Classification Search ............... 118/323, 118/321, 326, 309, 50, DIG. 7, 634; 901/43, 901/15, 27, 29, 41; 454/DIG. 46, 50, 53; 427/427.2; 414/217; 55/DIG. 46
See application file for complete search history.

(56) References Cited

U.S. PATENT DOCUMENTS

| 2,900,950 A | * | 8/1959 | Peeps ........................ 118/680 |
| 4,231,289 A | * | 11/1980 | Domicent .................... 454/52 |
| 4,850,382 A | * | 7/1989 | Williams ................ 134/167 R |
| 4,954,043 A | * | 9/1990 | Yoshida et al. .............. 414/719 |
| 5,429,682 A | | 7/1995 | Harlow, Jr. et al. .......... 118/681 |
| 6,296,706 B1 | | 10/2001 | Dattilo ....................... 118/612 |
| 2005/0051085 A1 | * | 3/2005 | Krogedal et al. ............ 118/313 |
| 2005/0066890 A1 | * | 3/2005 | Wetzel ....................... 118/313 |

FOREIGN PATENT DOCUMENTS

| BE | 897 107 | 10/1983 |
| DE | 1 125 322 | 9/1962 |
| DE | 299 22 479 U 1 | 6/2000 |
| DE | 101 19 906 A 1 | 10/2002 |
| DE | 696 29 246 T2 | 4/2005 |
| EP | 1 506 819 A2 | 2/2005 |

\* cited by examiner

*Primary Examiner*—Yewebdar T Tadesse
(74) *Attorney, Agent, or Firm*—Rader Fishman & Grauer (57) ABSTRACT

A coating plant having a multi-axis application robot to apply a coating means to an application object, where the application robot is installed hanging at least partially into a paint booth. A method for coating an object in a coating plant is also taught.

12 Claims, 7 Drawing Sheets

COATING PLANT AND ASSOCIATED METHOD OF COATING AN OBJECT

TECHNICAL FIELD

The invention relates to a coating plant and an associated installation or operating procedure or method in accordance with the coating plant.

BACKGROUND OF THE INVENTION

In WO 2004/037430 A1, a coating plant is known in which a frame is located in a paint booth. The frame carries several paint robots along its long sides where the entire frame with the paint robots is raised up on legs in relation to the foundation of the paint booth. This upwardly-offset installation of the paint robots requires less maintenance in comparison to floor-mounted paint robots and is theoretically less susceptible to contamination since the overspray in the paint booth drops down to floor-mounted paint robots more quickly and more densely.

There are a number of benefits to this design. First, the work space is utilized better. A smaller booth width is also possible. Finally, a smaller number of robot axes is possible. There are also a number of drawbacks to the high placement of the robots. Airfow is disturbed, i.e., the atomizer must always be located so that it is not positioned in the turbulence generated by air flow around the robot. Another drawback is the possible contamination of the car body by dirt from a robot. The location of these robots also results in poor access to the robot for maintenance and repair purposes.

A disadvantage of the coating plant in accordance with WO 2004/03743 A1 is that for the raised installation of the paint robots, an additional frame with legs has to be located in the paint booth. In addition, traditional paint robots are designed so that the work space is above the installation plane whereas the coating plant in accordance with WO 2004/037430 requires paint robots whose work space is below their installation plane.

SUMMARY OF THE INVENTION

The invention improves this known coating plant. The invention installation of the application robot at least partially hanging so that conventional paint robots can be used whose working space with standing installation is above the installation plane and with hanging installation it is below the installation plane. The term used within the scope of the invention of hanging installation of the application robot means preferably that the base of the application robot, compared with a traditional standing floor installation on a horizontal base, is inclined at an angle. The angle is greater than 90°, 100°, or even 110°, and in the cases of overhead assembly can be up to 180°, with any number of possible values in between.

In addition, the term of a hanging installation of the application robot means preferably that the operating range of the application robot lies principally or even completely below the installation plane, as was previously indicated. The operating range of the application robot means the spatial area inside the paint booth that can be reached by the application robot for coating an object for application (e.g., a vehicle body). The installation plane in this sense on the other hand is the plane, or the height in the paint booth at which the base of the application robot is attached to the foundation or a supporting structure.

The hanging installation offers the advantage already mentioned that the application robot because of its assembly position in the upper area of the paint booth is less contaminated, which reduces the expense for maintenance and cleaning of the application robot.

Secondly, the arrangement in accordance with the invention of the application robot in the upper area of the paint booth is more favorable from the standpoint of airflow. This increases transfer efficiency and contributes to a reduction of overspray.

Hanging installation of the application robot additionally allows a reduction of the number of application robots in the individual paint booths. With hanging installation of the application robot, the possibility exists that only a single application robot is located in a paint booth. The single robot can coat the application objects (e.g., vehicle bodies) from all sides because of the installation in accordance with the invention. Such a reduction in the number of application robots in the individual paint booth brings about a considerable reduction in costs (e.g., for components, repair, paint, flushing agents, etc.).

It is particularly advantageous if the application robot is positioned in the paint booth such that the application object to be coated is essentially in the center of the operating range of the application robot and/or is completely within the operating range of the application robot.

In a variant of the invention, the application robot is mounted hanging in an essentially horizontal ceiling of a paint booth. This overhead assembly of the application robot allows a coating of the application object in the paint booth (e.g., vehicle bodies) on both sides so that a single application robot is sufficient in each paint booth, as was mentioned previously.

In another variant of the invention, the application robot is installed hanging in an inclined, diagonal side wall of the paint booth. The inclination of the side wall of the paint booth in the upper area has proven to be favorable from an airflow standpoint, which improves transfer efficiency and reduces overspray. The installation of the application robot in the inclined sidewall of the paint booth is preferably used when application robots are provided on both sides of the paint booth since the application robots on one side then coat only the areas of the application object on their side without having to reach the opposite side of the application object.

The side wall of the paint booth can be inclined to the vertical at an angle, for example an angle of between 5° and 40°, where any values within this range are possible.

The paint booth in this variant of the invention has a cross-section that tapers toward the top, which has proven to be favorable from an airflow standpoint, contributing to an increase in transfer efficiency and to a reduction in overspray.

In the two variants of the invention described previously (overhead installation or sidewall installation), the side wall or the ceiling of the paint booth can itself be a load-bearing structure that carries the application robot. This, however, requires a corresponding mechanical reinforcement of the side wall, or ceiling, of the paint booth.

It is alternatively possible to locate a load-bearing structure outside the paint booth that carries the application robot, while the side wall or the ceiling of the paint booth is non-load bearing. There is an opening in the side wall or the ceiling of the paint booth through which the application robot extends into the paint booth. The side wall or the ceiling of the paint booth have the sole function of providing walls that are as smooth as possible for the paint booth, which is particularly important with the "clean wall concept." The outside load-bearing structure on the other hand has the sole task of holding the application robot. This separation of functions allows optimal constructional design of the side wall or ceiling of the paint booth on the one hand and of the load-bearing structure on the other for their respective functions.

The coating plant in accordance with the invention furthermore preferably has a track along which the application robot can be moved. This advantageously enlarges the operating range of the application robot by positioning the application robot at a suitable point along the track.

In a variation of the invention the track is a closed loop, where the track can be circular or oval, for example. A track shaped in this way allows considerable expansion of the operating range of the application robot, where even unidirectional movement of the application robot is adequate.

In another variant, the track runs parallel to the application object and/or perpendicular to the application object, where several tracks can be provided between which the application robot switches.

It is desirable that the airflow in the painting area inside the paint booth is affected as little as possible by the track. Preferably the track is located outside the painting area for this reason. This can be accomplished preferably by positioning the track for the application robot above the painting area. With the vertical layout above the body, the track is preferably outside the coating area.

In a preferred embodiment of the invention, the track has a rail that guides the application robot in the lateral direction relative to the rail and holds it in the vertical direction.

In another embodiment of the invention, the application robot is installed immovable inside the paint booth. This makes particular sense when the application robot is installed hanging in a sloping, diagonal side wall of the paint booth, as was previously described.

It should further be mentioned that the paint booth of the coating plant in accordance with the invention preferably has an inwardly-curved ceiling, which has proved to be favorable to airflow and likewise contributes to increasing transfer efficiency and reduction of overspray.

It further makes sense when the application robot at least in one possible position is essentially centered over the application object so that the application robot can coat the application object on both sides so that a single application robot is adequate in each paint booth.

It is furthermore advantageous if the paint booth has side walls that are at least partially transparent. Firstly, this allows a visual check of the painting process from outside. Secondly, side walls of glass are electrically non-conductive, which is advantageous with electrostatic finishing.

The invention further comprises a suitable procedure for installing and/or operating a multi-axis application robot in a coating facility in which the application robot is installed and/or operated at least partially hanging.

The term application robot used within the scope of this invention preferably comprises multi-axis application robots having, 4, 5, 6 or 7 axes. These robots also preferably have a conventional robot wrist. Of course, the application robots used in the invention are not so limited. Any robot can be used as long as it is capable of operating when at least partially hanging into the paint booth.

The invention is further not restricted to liquid or powder paint with respect to the coating means being applied but can be realized with other coating means.

The application robot preferably carries an atomizer, for example, a rotary atomizer, which can preferably carry an electrostatic charge.

Other advantageous versions of the invention are identified and explained in what follows together with the description of the preferred embodiment of the invention with reference to the drawings.

BRIEF DESCRIPTION OF THE DRAWING

The description herein makes reference to the accompanying drawing wherein like reference numerals refer to like parts throughout the several views, and wherein.

DETAILED DESCRIPTION OF THE PREFERRED EMBODIMENTS

Figure 1A:
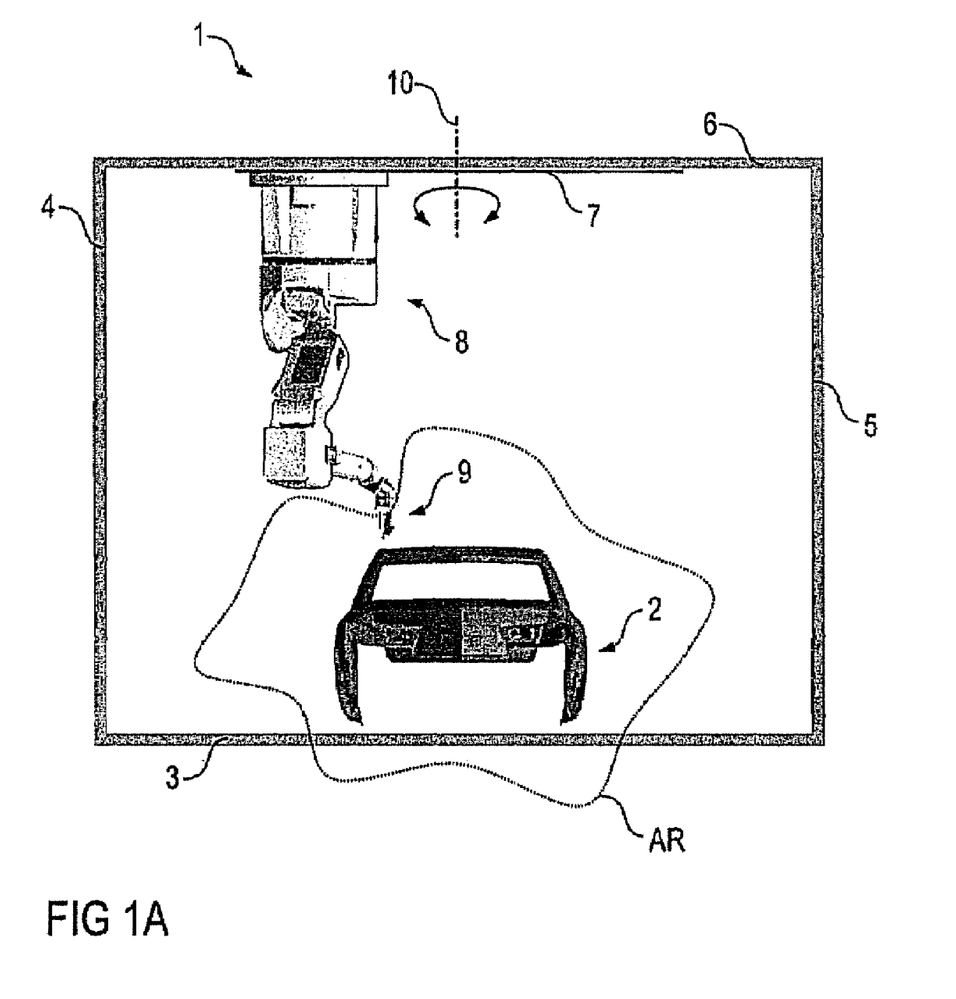
FIGS. 1A-1C show various views of a paint booth for a coating plant in accordance with the invention.
Figure 1B:
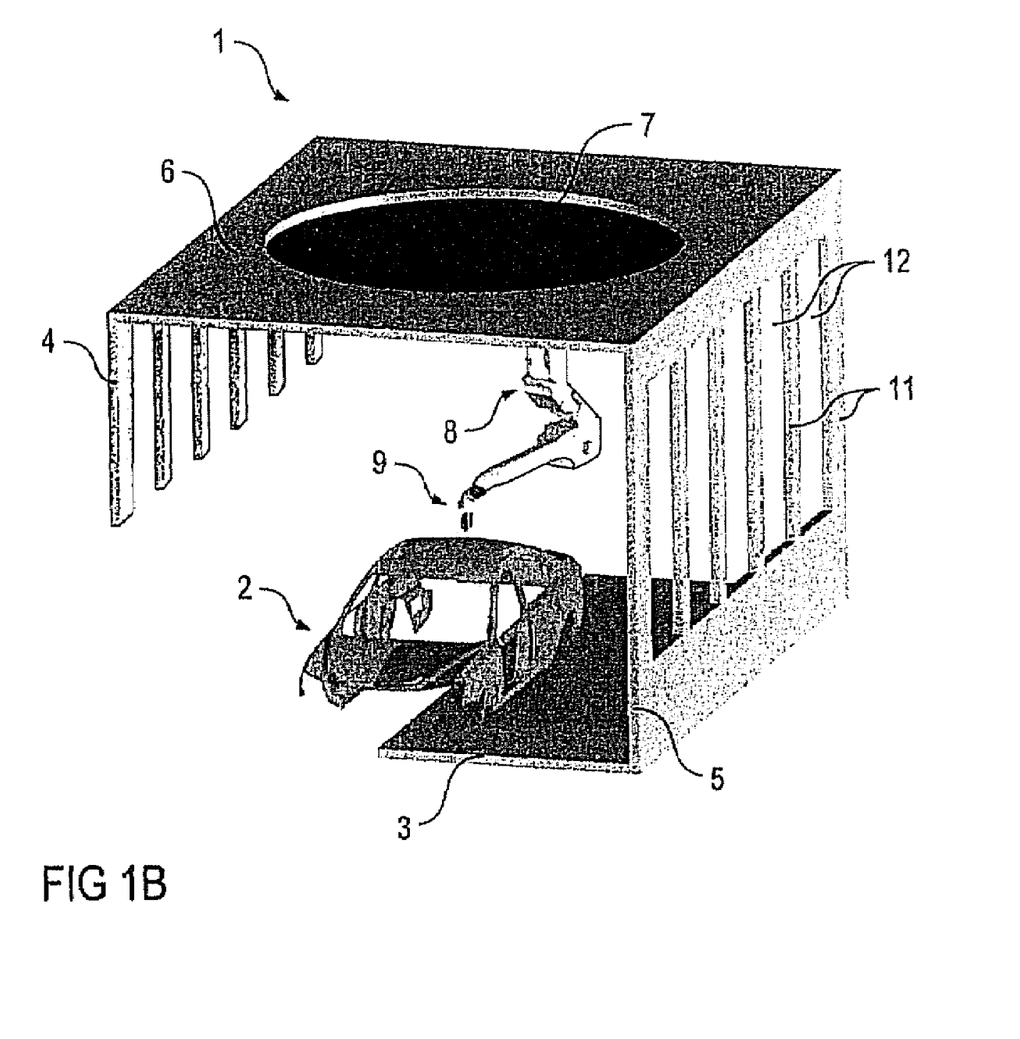
Figure 1C:
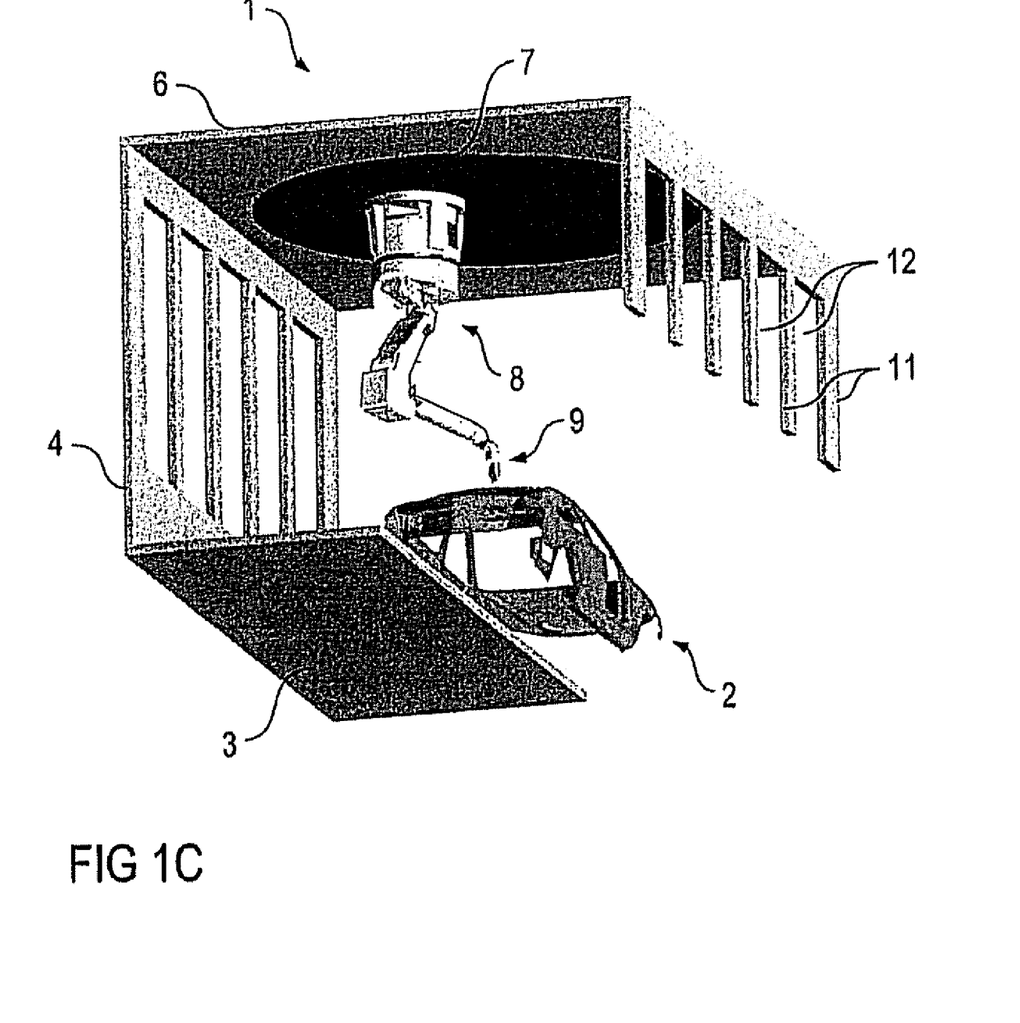

The drawings in FIGS. 1A-1C show a first embodiment of a paint booth 1 in a coating plant in accordance with the invention for coating vehicle bodies, where only a single vehicle body 2 is shown in the drawings.

Moreover, other paint booths are located in front of and behind the paint booth 1 shown, which is known from traditional coating plants and is therefore not described further.

The paint booth 1 has a floor 3, side walls 4, 5 and a ceiling 6, which are configured on their insides as smoothly as possible in accordance with the so-called "Clean Wall Concept" to make it more difficult for remnants of coating means to adhere and to make cleaning easier.

On the ceiling 6 of the paint booth 1 there is at least one rail 7, and preferably an array of rails 7, to which a paint robot 8 is installed hanging over head, where the paint robot 8 carries a rotary atomizer 9 with electrostatic external charging.

The paint robot 8 and the rotary atomizer 9 are both conventionally constructed so that in what follows there is no detailed description of the paint robot 8 and the rotary atomizer 9.

The overhead installation of the paint robot 8 inside the paint booth 1 has the advantage that the paint robot 8 is only minimally contaminated by overspray, since the overspray in the paint booth drops down. This reduces costs for maintenance and cleaning of the paint robot 8.

Secondly, the location of the paint robot 8 in the upper area of the paint booth 1 is more favorable from an airflow standpoint, which contributes to increasing transfer efficiency and correspondingly reducing overspray.

The paint robot 8 is not fixed in one place to the ceiling 6 of the paint booth 1 but can be rotated around an axis 10 along the circular array of rails 7, as can be seen particularly in FIGS. 1B and 1C. The paint robot 8 can therefore be moved along the array of rails 7 first on one side of the vehicle body 2 in order to coat that side of the vehicle body 2. Then the paint robot 8 can be moved along the array of rails 7 to the other side of the vehicle body to coat that side of the vehicle body 2 as well. This highly mobile control of the paint robot 8 inside the paint booth 1 makes it possible to position only one paint robot 8 inside the paint booth 1, which can coat the vehicle body 2 from all sides, including interior painting. The associated reduction in the number of paint robots 8 in the paint booth 1 brings a considerable reduction in costs for components, repair, paint, purging agents, etc.

It can also be seen from FIG. 1A that the paint robot 8 has a specific operating area AR, which is shown only schematically and highly simplified by a dotted line. In practice, the operating area AR has a structurally different contour in accordance with the design and geometry of the paint robot 8.

However, it can be seen from this depiction that the vehicle body 2 lies completely within the operating area AR so that the paint robot can coat the entire vehicle body without the need for an additional paint robot.

In other variations, two robots can share one rail or the robot 8 can share the rails 7 with a handler for opening and closing doors, etc. In these variations, an emergency strategy or break-down concept is possible since robots can overtake each other optimally.

It can also be seen from FIG. 1A that the operating area AR of the paint robot 8 lies completely below the mounting position in the ceiling 6 of the paint booth 1. In contrast to the known coating plant from WO 2004/037430 A1 mentioned at the outset, almost the entire operating area AR can be used in finishing operations.

It can be seen further from FIGS. 1B and 1C that the side walls 4, 5, of the paint booth consist of pillars 11 running perpendicular with viewing windows 12 set into the intervals between the pillars 11. This combination of pillars 11 and viewing windows 12 allows visual inspection of the finishing process inside the paint booth 1.

Figure 2A:
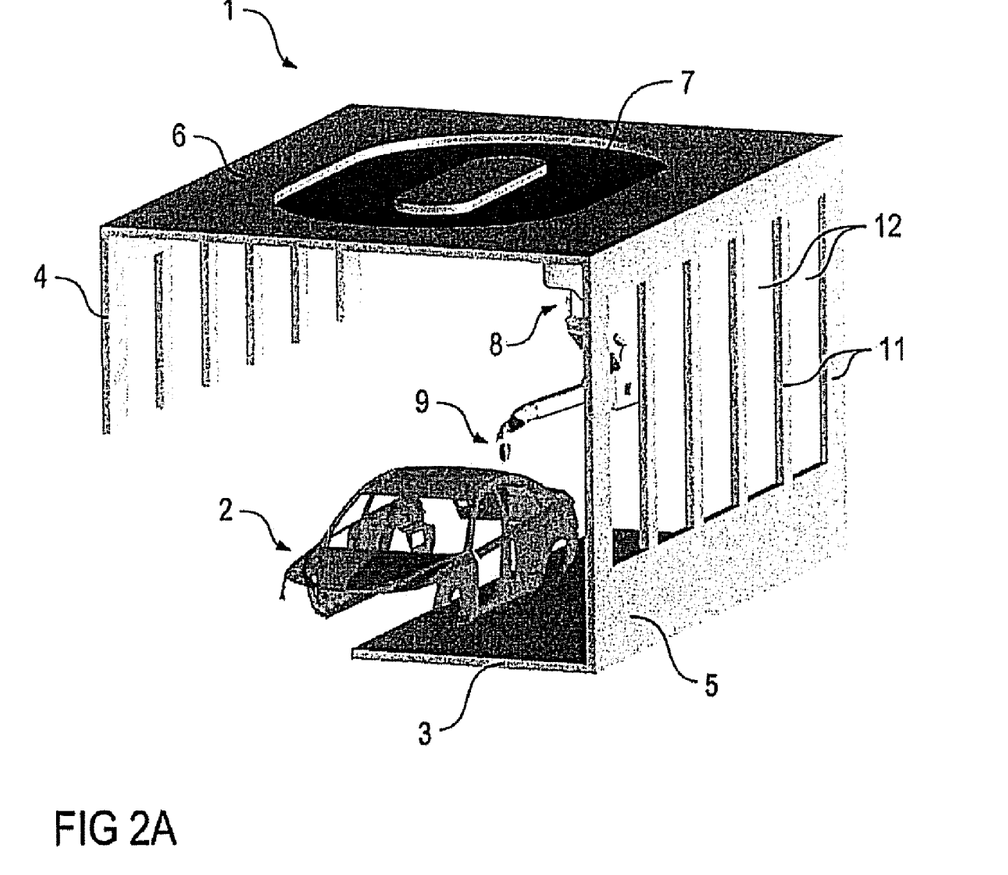
FIGS. 2A and 2B show various views of a modified embodiment of a paint booth as described with reference to FIGS. 1A-1C.
Figure 2B:
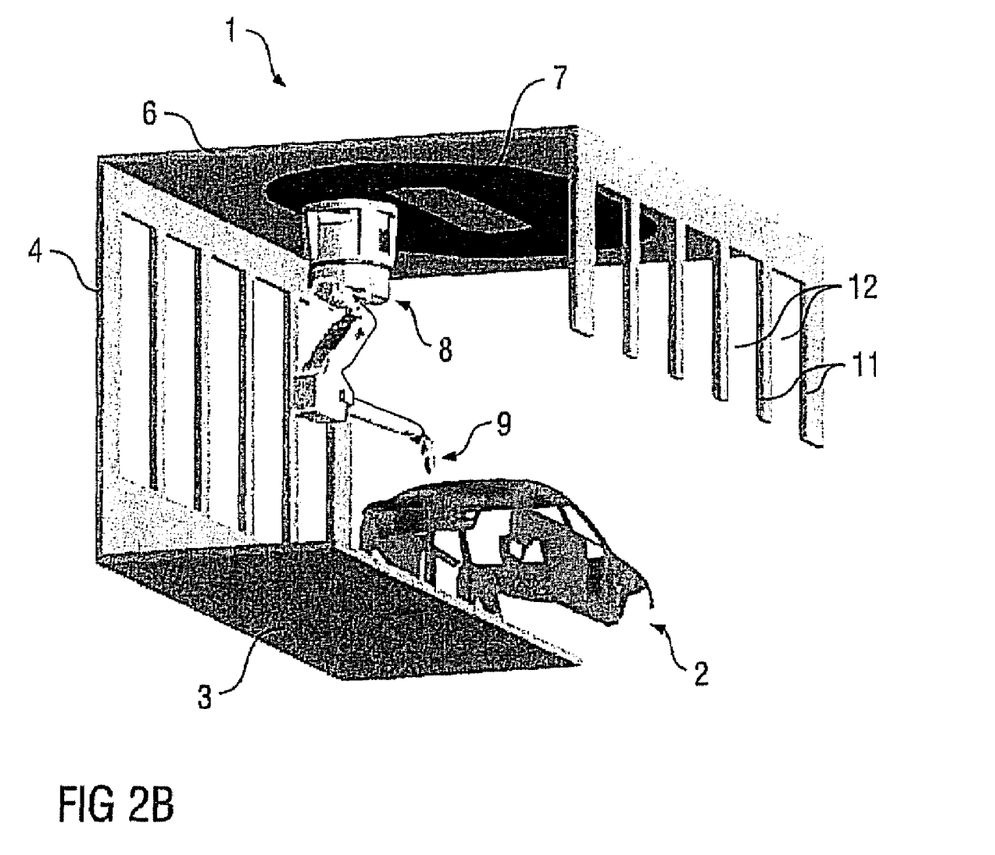

FIGS. 2A and 2B show an alternative embodiment of such a paint booth 1, which is largely identical to the embodiment previously described and shown in FIGS. 1A to 1C. To avoid repetition, reference is made in what follows largely to the description for FIGS. 1A-1C, where the same reference numbers are used for identical parts.

One special feature of this alternative embodiment is that the array of rails 7 in the ceiling 6 of the paint booth are not circular, but are oval. This configuration for the array of rails 7 makes sense when application objects like the vehicle body 2 to be painted are themselves lengthy. Although oval or circular rail(s) 7 are preferable, other shapes are possible. A rectangular or square shape is also possible. Also, the rail(s) 7 could be either longitudinally- or perpendicularly-extending with respect to the application object.

Figure 3A:
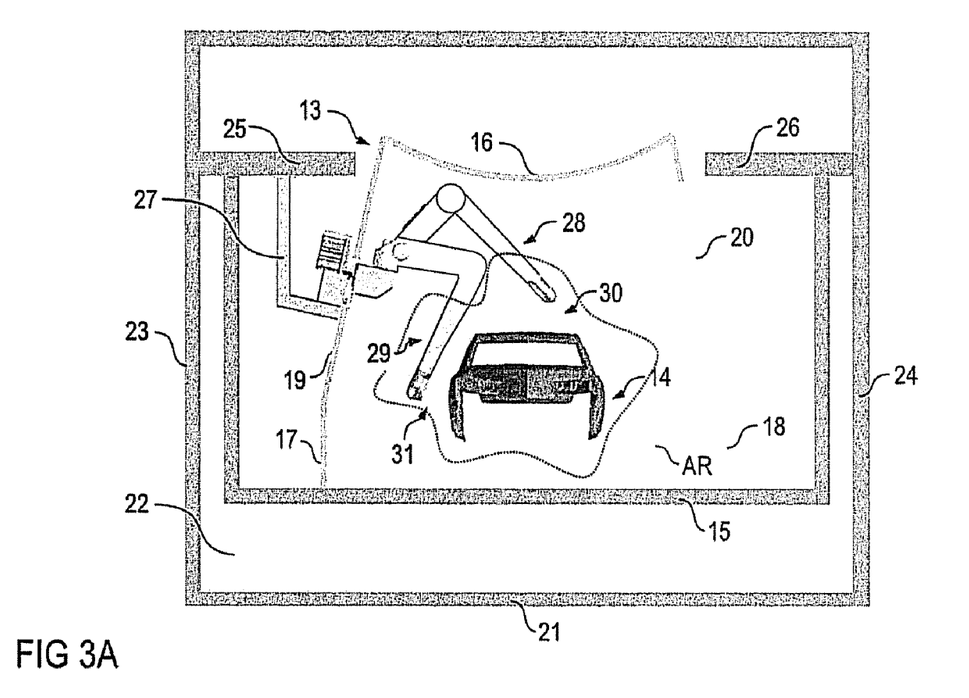
FIGS. 3A and 3B show different views of another embodiment of a paint booth in a coating plant in accordance with the invention.
Figure 3B:
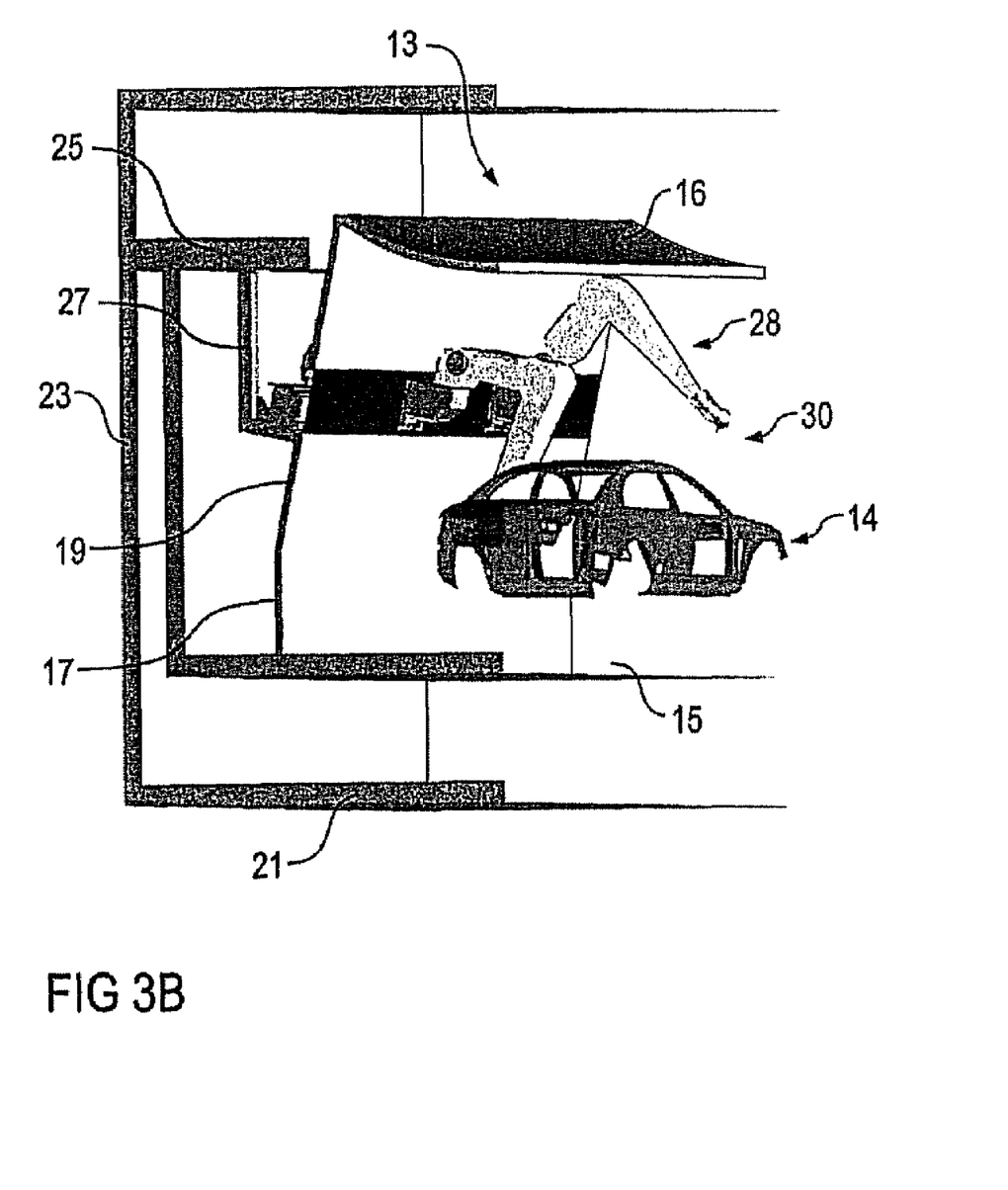

FIGS. 3A and 3B show another embodiment of a paint booth 13 for a coating plant in accordance with the invention for painting vehicle bodies, with only a single vehicle body 14 being shown in the drawings.

The paint booth 13 again has a floor 15 and a ceiling 16, where the ceiling 16 in the paint booth 13 is curved inward into the paint booth 13 for reasons of airflow. In addition, the paint booth 13 is demarcated on the sides by a side wall section 17 or 18 running essentially vertical and a side wall section 19 or 20, inclined inward, where the angle of the side wall sections 19, 20 to the vertical is about 100 (with reference to a full circle having 360°).

The paint booth 13 also has a cross-section that tapers upward, which is also favorable to airflow and improves transfer efficiency and reduces overspray.

Below the floor 15 of the paint booth 13, there is a foundation 21 of the coating plant, where the floor 15 of the paint booth 13 and the basement 21 enclose an intervening space 22. In this space 22, for example, control units and auxiliary equipment for the coating plant can be kept.

The coating plant in accordance with the invention has solid, load-bearing side walls 23, 24 that hold respective load-bearing beams 25, 26 extending from the side walls 23, 24 into the interior.

A load bearing structure 27 is attached to the underside of the beam 25. The structure 27 carries a multi-axis paint robot 28 hanging overhead, where the paint robot 28 extends through an opening in the side wall section 19 into the paint booth 13. In contrast to the preceding embodiments, the side wall section 19 does not have any load-bearing function and its design can therefore be advantageously optimized for its true function, to provide the smoothest possible interior for the paint booth 13.

From the perspective view in FIG. 3B it can further be seen that in addition to the paint robot 28 a further paint robot 29 is located in the paint booth 13. In the paint booth 13, the two paint robots 28, 29 each carry a rotary atomizer 30 or 31, respectively, with electrostatic external charging.

On the side of the paint booth 13 opposite the two paint robots 28, 29, one or more handling robots (e.g., a hood opener, door opener) can be located on the beam 26, which robot(s) are not shown here for the sake of simplicity.

In this embodiment, the hanging installation of the two paint robots 28, 29 in the upper area of the paint booth 13 is favorable for airflow, which contributes to an increase in transfer efficiency and a corresponding reduction of overspray. In addition, this installation reduces contamination of the paint robots 28, 29 due to the overspray sinking.

Finally, the contour of the operating area AR for the paint robots 28, 29 can be seen again from FIG. 3A, where the vehicle body 14 to be coated also lies completely within the operating area AR. In addition, the operating area AR is almost completely below the installation level.

The invention is not limited to the embodiments heretofore described. Rather, a plurality of variants and modifications is possible which similarly make use of the inventive concept and therefore fall within its scope.

What is claimed is:

1. A coating plant, comprising:
   a paint booth;
   a multi-axis application robot for applying a coating to an application object; wherein the multi-axis application robot is at least partially hanging into the paint booth; and
   an inwardly-inclined side wall of the paint booth, wherein the multi-axis application robot is installed hanging through an opening of the inwardly-inclined side wall.

2. The coating plant according to claim 1 wherein only one multi-axis application robot is located within the paint booth.

3. The coating plant according to claim 2 wherein opposite sides of the application object can be reached by the multi-axis application robot for application of the coating means.

4. The coating plant according claim 1, further comprising: at least one track along which the multi-axis application robot can be moved.

5. The coating plant according to claim 4 wherein the at least one track is one of ring-shaped and oval-shaped and parallel and perpendicular with respect to the application object.

6. The coating plant according to claim 4, farther comprising:
   a painting area in which the coating means is applied; and wherein the at least one track is located outside the painting area.

7. The coating plant according to claim 6 wherein the at least one track is located above the painting area.

8. The coating plant according to claim 1 wherein the multi-axis application robot is immovably installed.

9. The coating plant according to claim 1, further comprising:
   an inwardly-curved ceiling of the paint booth.

10. The coating plant according to claim 1, further comprising:
    a load-bearing structure located outside the paint booth, the load-bearing structure carries the multi-axis application robot.

11. The coating plant according to claim 1 wherein the multi-axis application robot is mounted essentially centered over the application object.

12. The coating plant according to claim 1, further comprising:
    a second side wall of the paint booth, the second side wall being at least partially transparent.

* * * * *